United States Patent
Kang

(10) Patent No.: US 10,167,984 B2
(45) Date of Patent: Jan. 1, 2019

(54) PIPE CONNECTOR AND PIPE-CONNECTED EMBEDDED BOX INCLUDING SAME

(71) Applicant: Ok-su Kang, Gyeonggi-do (KR)

(72) Inventor: Ok-su Kang, Gyeonggi-do (KR)

( * ) Notice: Subject to any disclaimer, the term of this patent is extended or adjusted under 35 U.S.C. 154(b) by 287 days.

(21) Appl. No.: 15/109,648

(22) PCT Filed: Feb. 4, 2015

(86) PCT No.: PCT/KR2015/001145
§ 371 (c)(1),
(2) Date: Jul. 4, 2016

(87) PCT Pub. No.: WO2015/122645
PCT Pub. Date: Aug. 20, 2015

(65) Prior Publication Data
US 2016/0334043 A1    Nov. 17, 2016

(30) Foreign Application Priority Data
Feb. 12, 2014    (KR) ........................ 10-2014-0016208

(51) Int. Cl.
*F16L 47/32* (2006.01)
*F16L 15/00* (2006.01)

(52) U.S. Cl.
CPC ............. *F16L 47/32* (2013.01); *F16L 15/006* (2013.01)

(58) Field of Classification Search
CPC ..... F16L 13/007; F16L 25/0072; F16L 57/06; F16L 2101/18; F16L 45/00; F16L 41/03;
(Continued)

(56) References Cited

U.S. PATENT DOCUMENTS 951,207 A * 3/1910 Vissering .............. B61C 15/102
                                                                  285/16
1,668,855 A * 5/1928 Ludlum .................... E02F 3/90
                                                                 285/119
(Continued)

FOREIGN PATENT DOCUMENTS

CN          1856677 A       11/2006
CN        201096249 Y        8/2008
(Continued)

OTHER PUBLICATIONS

International Search Report and the Written Opinion dated May 19, 2015 From the Korean Intellectual Property Office Re. Application No. PCT/KR2015/001145 and Its Translation Into English.
(Continued)

*Primary Examiner* — Aaron M Dunwoody
(74) *Attorney, Agent, or Firm* — Park & Associates IP Law, P.C.

(57) ABSTRACT

The present invention relates to a pipe connector and a pipe-connected embedded box including the same. The pipe connector comprises a connector body and an insert object. The connector body has: a first fluid channel formed along a first fluid channel axis line; a second fluid channel formed along a second fluid channel axis line which does not intersect with the first fluid channel axis line; a first connection part through which a first external pipe is connected to the first fluid channel along the first fluid channel axis line; and a second connection part through which a second external pipe is connected to the second fluid channel along the second fluid channel axis line, and the insert object has: a first connection fluid channel that is embedded in the connector body, has a first opening that is open toward the interior of the first fluid channel through the side wall of the first fluid channel, and extends in a horizontal direction to the first fluid channel axis line; and a second connection fluid (Continued)

channel that bends and extends from the first connection fluid channel and has a second opening that is open along the second fluid channel axis line. As described above, the present invention provides the pipe connector having the non-intersecting fluid channels which can be manufactured through injection molding of a single plastic material. In addition, the present invention provides a space-efficient and slim pipe-connected embedded box using the pipe connector having the non-intersecting fluid channels.

12 Claims, 3 Drawing Sheets

(58) Field of Classification Search
CPC ......... F16L 41/026; F16L 47/26; F16L 47/28; F16L 47/32; F16L 58/188
USPC ............ 285/133.4, 16, 17, 56, 286.1, 285.1, 285/293.1, 129.1, 129.2
See application file for complete search history.

(56) References Cited

U.S. PATENT DOCUMENTS

| | | | | |
|---|---|---|---|---|
| 4,631,212 A | * | 12/1986 | Shifflett | F16L 41/03 279/99 |
| 5,366,257 A | * | 11/1994 | McPherson | F16L 47/32 285/148.11 |
| 6,000,436 A | * | 12/1999 | Auvil | B29C 47/28 138/109 |
| 8,424,923 B2 | * | 4/2013 | Inman, Jr. | A61M 39/10 285/125.1 |
| 8,840,148 B2 | * | 9/2014 | Defilippi | F16L 41/008 285/133.21 |
| 2005/0067033 A1 | | 3/2005 | Flynn et al. | |
| 2007/0251578 A1 | * | 11/2007 | McGuire | F16L 37/088 137/375 |
| 2008/0299446 A1 | * | 12/2008 | Kelly | H01M 2/1077 429/88 |

FOREIGN PATENT DOCUMENTS

| | | |
|---|---|---|
| CN | 101668981 A | 3/2010 |
| CN | 202955400 U | 5/2013 |
| EP | 1 249 285 A2 | 10/2002 |
| JP | 50-027662 | 3/1975 |
| JP | 07-083378 | 3/1995 |
| JP | 3423291 | 7/2003 |
| KR | 10-0713588 | 5/2007 |
| KR | 10-2010-0102801 | 9/2010 |
| WO | WO 99/46531 | 9/1999 |
| WO | WO 2015/122645 | 8/2015 |

OTHER PUBLICATIONS

Chinese Office Action (CN 201580003763.4), SIPO, dated Jan. 22, 2017.

* cited by examiner

PIPE CONNECTOR AND PIPE-CONNECTED EMBEDDED BOX INCLUDING SAME

RELATED APPLICATIONS

This application is a National Phase of PCT Patent Application No. PCT/KR2015/001145 having International filing date of Feb. 4, 2015, which claims the benefit of priority of Korean Patent Application No. 10-2014-0016208 filed on Feb. 12, 2014. The contents of the above applications are all incorporated by reference as if fully set forth herein in their entirety.

FIELD AND BACKGROUND OF THE INVENTION

The present invention relates to a pipe connector and a pipe-connected embedded box including the same.

In order to distribute cold water and hot water into a building, a pipe-connected embedded box has been used. Connectors having various pipe structures are connected to the pipe-connected embedded box in order to supply cold water and hot water in several directions.

Most pipe connectors are formed using plastic through injection molding. However, the injection molding can be used only when internal fluid channels cross each other, and the internal fluid channels that connect the fluid channels to each other are not able to be formed by slide cores when these fluid channels do not cross each other. Thus, a connector including two or more fluid channels which do not cross each other is used is manufactured by not a plastic injection molding but a casting method using a metal material such as brass or cast iron. The weight of the metal connector is heavy, and the productivity thereof is remarkably decreased. Further, the material cost of the metal connector is expensive, and thus, the manufacturing cost thereof is greatly higher than that of a product formed through injection molding.

Meanwhile, a method of manufacturing the internal fluid channel that connects the non-crossing fluid channels to each other using a separate metal material and forming the internal fluid channel through insert molding can be expected. However, this method has a problem that separate inserts for internal fluid channels need to be cast using metal. Furthermore, since the inserts are made from the metal different from the plastic, a problem that the metal is separated from the plastic due to a change in temperature or deformation of material in an actual usage environment occurs, and there is a limitation on durable usage.

SUMMARY OF THE INVENTION

Accordingly, an object of the present invention is to provide a pipe connector that includes fluid channels which do not cross each other and is capable of being manufactured using a single plastic material through injection molding.

Another object of the present invention is to provide a pipe-connected embedded box which is efficient and slim in terms of space by using the pipe connector including the fluid channels which do not cross each other.

In order to achieve the above object, according to the present invention, there is provided a pipe connector including: an insert object that includes a first fluid channel which is formed along a first fluid channel axial line, a second fluid channel which is formed along a second fluid channel axial line which does not cross the first fluid channel axial line, a first connection part at which a first external pipe is connected to the first fluid channel along the first fluid channel axial line, a connector body at which a second external pipe is connected to the second fluid channel along the second fluid channel axial line, a first connection fluid channel which is embedded within the connector body, has a first opening open into the first fluid channel through a sidewall of the first fluid channel and extends in a transversal direction with respect to the first fluid channel axial line, and a second connection fluid channel which extends from the first connection fluid channel so as to be bent and has a second opening open along the second fluid channel axial line.

Here, it is preferable that the second opening has a rotation stopping shaped part having a non-circular shape in at least a partial circumferential region with respect to a center of the axis. In such a configuration, the rotation of the insert object is stopped, and thus, a position can be accurately set.

It is preferable that the first opening includes a curved cut-off end matching with an inner wall surface of the first fluid channel.

It is more preferable that the first connection fluid channel has a thickness greater than a thickness of the second connection fluid channel.

It is preferable that a reinforcing rib is formed at any one of an outer wall and an inner wall of the first connection fluid channel.

It is preferable that the first connection fluid channel and the second connection fluid channel cross each other at an acute angle. In such a configuration, the thickness of the pipe-connected embedded box can be reduced.

Another object of the present invention is achieved by a pipe-connected embedded box including: the above-described pipe connector.

According to the present invention, a pipe connector that includes fluid channels which do not cross each other and is capable of being manufactured using a single plastic material through injection molding is provided. A pipe-connected embedded box which is efficient and slim in terms of space is provided using the pipe connector including the fluid channels which do not cross each other.

DESCRIPTION OF SPECIFIC EMBODIMENTS OF THE INVENTION

Hereinafter, embodiments of the present invention will be described with reference to the drawings.

Figure 1:
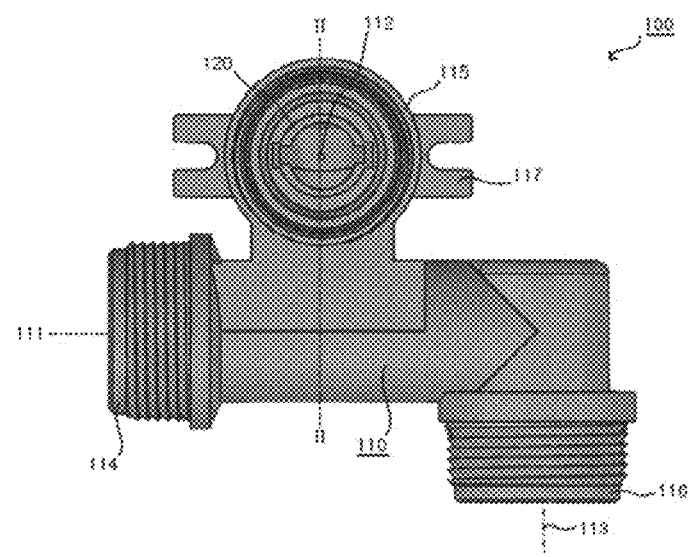
FIG. 1 is a plan view of a first embodiment of a pipe connector according to the present invention.
Figure 2:
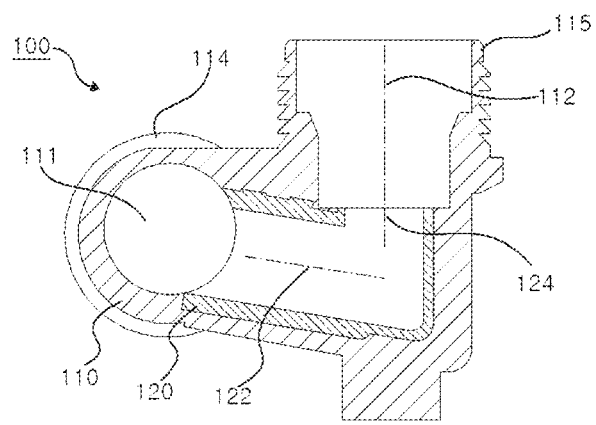
FIG. 2 is a sectional view taken along line II-II of FIG. 1.

FIG. 1 is a plan view showing a first embodiment of a pipe connector 100 according to the present invention, and FIG. 2 is a sectional view of the pipe connector 100 according to the present invention. As shown in these drawings, the pipe connector 100 includes a connector body 110, and an insert object 120 embedded in the connector body 110.

The connector body 110 includes a first fluid channel 111 that is formed along a first fluid channel axial line, a second fluid channel 112 that is formed along a second fluid channel axial line which does not cross the first fluid channel axial line, and a third fluid channel 113 that is bent and is connected to the first fluid channel 111 along a third fluid channel axial line. First to third connection parts 114, 115 and 116 to which first to third external pipes are respectively connected are provided at the first to third fluid channels 111, 112 and 113. A fixation part 117 for fixing the pipe connector 100 within a pipe-connected embedded box 200 to be described below is formed under the second fluid channel 112 in parallel with a first fluid channel axial line direction. The fixation part 117 may be coupled to the pipe-connected embedded box 200 through various means such as insertion coupling, bolt and nut coupling or screw coupling.

Figure 3:
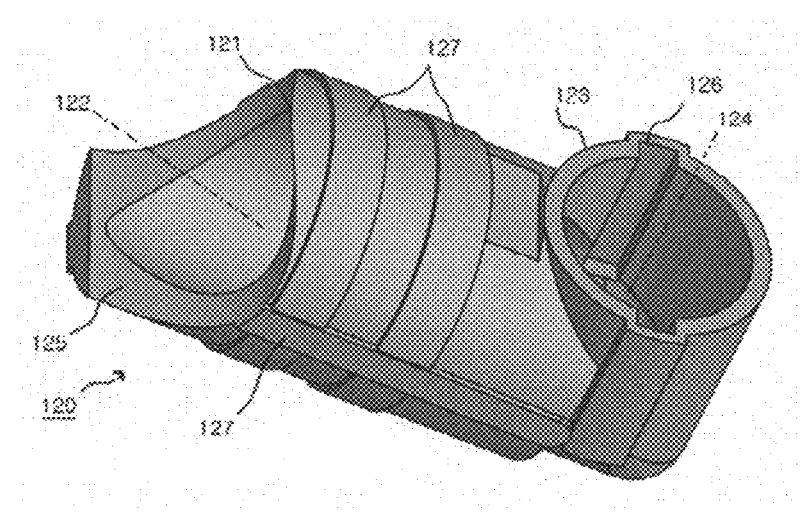
FIG. 3 is a perspective view of an insert object.

The first fluid channel 111 and the second fluid channel 112 do not cross each other. In order to allow the non-crossing channels to be connected to each other, the insert object 120 for forming a connection fluid channel is embedded in the connector body 110. As shown in FIG. 3, the insert object 120 includes a first connection fluid channel 122 that has a first opening 121 which is open to the inside of the first fluid channel 111 through a sidewall of the first fluid channel 111 and extends in a transversal direction with respect to the first fluid channel axial line, and a second connection fluid channel 124 that extends from the first connection fluid channel 122 so as to be bent, and has a second opening 124 open along the second fluid channel axial line.

The first opening 121 formed in an end of the first connection fluid channel 122 includes a curved cut-off end 125 matching with an inner wall surface of the first fluid channel 111. The curved cut-off end 125 has a shape corresponding to a slide core inserted into the first fluid channel 111, and the slide core inserted into the first fluid channel 111 is completely in contact with the curved cut-off end 125. The first fluid channel 111 and the first connection fluid channel 122 are communicatively connected by removing the slide core after the pipe connector 100 is formed through injection molding in the contact state.

A pair of rotation stopping shaped parts 126 each having a square slit shape are formed in the second opening 123 formed in the second connection fluid channel 124 in partial circumferential regions with respect to a center of the axis so as to face each other in the transversal direction with respect to an axial line. When the slide core is inserted in to the second connection fluid channel 124, the rotation stopping shaped parts 126 serves to fix the insert object 120 to the slide core such that the slide core is not rotated. Insertion protrusions corresponding to the rotation stopping shaped parts 126 are formed at one end of the slide core inserted into the second connection fluid channel 124, and thus, the insert object 120 is prevented from being rotated with respect to the slide core within the second connection fluid channel 124. Accordingly, a position is accurately set. The rotation stopping shaped parts 126 may be replaced with various shaped parts such as a shaped part having a square cross section in which a cross sectional shape in the transversal direction with respect to the second fluid channel axial line is a non circular shape and a unevenness shaped part.

The thickness of the second connection fluid channel 124 is less than the thickness of the first connection fluid channel 122. By doing this, since the slide core is inserted into the second connection fluid channel 124, even though the second connection fluid channel 124 is melt by the temperature plastic molten at the time of forming the pipe connector 100 through injection molding, the forming of the second fluid channel 112 of the pipe connector 100 is not affected.

By contrast, the first connection fluid channel 122 has a wall thickness thicker than the second connection fluid channel 124. More preferably, the thickness of the first connection fluid channel 122 is two times greater than the thickness of the second connection fluid channel 124. By doing this, since the slide core is not inserted into the first connection fluid channel 122 at the time of forming the pipe connector 100 by inserting the insert object 120, the first connection fluid channel 122 is prevent from being deformed by being melted due to the temperature of the molten plastic, and thus, the first fluid channel 111 and the first connection fluid channel 122 are prevented from being constricted. Accordingly, the first fluid channel and the first connection fluid channel are communicatively connected. Reinforcing ribs 127 are formed at an outer wall of the first connection fluid channel 122. The reinforcing ribs 127 prevent the first connection fluid channel 122 from being deformed by being melted at the time of forming the pipe connector 100 by inserting the insert object 120.

Meanwhile, the first connection fluid channel 122 and the second connection fluid channel 124 of the insert object 120 cross each other at an acute angle. When the first connection fluid channel 122 and the second connection fluid channel 124 cross each other at a right angle, a difference in height between the first fluid channel 111 and the first connection fluid channel 122 is generated due to a difference in diameter between these fluid channels, and a negative influence is exerted when the pipe connector 100 is embedded in the pipe-connected embedded box 200. Thus, since the first connection fluid channel 122 and the second connection fluid channel 124 cross each other at the acute angle, the entire height of the pipe connector 100 can be reduced, and the entire thickness of the pipe-connected embedded box 200 can be reduced at the time of installing the pipe connector 100 at the pipe-connected embedded box 200. Further, the pipe connector 100 can be efficiently disposed within the pipe-connected embedded box 200.

Figure 4:
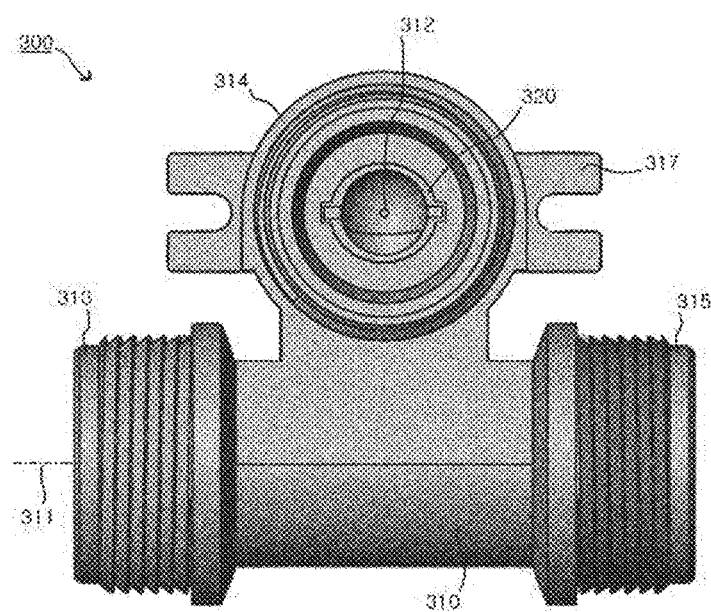
FIG. 4 is a plan view of a second embodiment of the pipe connector according to the present invention.

FIG. 4 is a plan view showing a second embodiment of a pipe connector 300 according to the present invention. As shown in this drawing, the second embodiment includes a first fluid channel 311, and a second fluid channel 312 which does not cross the first fluid channel 311. A first connection part 313 and a third connection part 315 are provided along the first fluid channel 311 so as to face each other, and a single second connection part 314 is provided along the second fluid channel 312. An insert object 320 that connects the first fluid channel 311 and the second fluid channel 312 and a fixation part 317 under the second fluid channel 312 are substantially the same as the insert object 120 and the fixation part 117 of the first embodiment shown in FIG. 1.

In addition to the illustrated embodiment, an additional connection part disposed according to the second fluid channel axial line so as to face the second connection part 314 may be further added at the second fluid channel 312, and various pipe connectors having various structures may also be manufactured using the insert object which is the feature of the present invention.

In the aforementioned pipe connector 100, after the insert object 120 is initially formed through injection molding, the connector body 110 is formed through injection molding while the insert object 120 is embedded. Initially, the insert object 120 is inserted into a mold, and the slide cores are inserted into then the first fluid channel 111, the second fluid channel 112 and the third fluid channel 113. The slide core inserted into the first fluid channel 111 is completely in contact with the curved cut-off end 125 formed at the first opening 121 of the insert object 120. The slide core inserted into the second connection fluid channel 124 includes the insertion protrusions corresponding to the rotation stopping shaped parts 126 formed at the second opening 123 of the insert object 120, and the insertion protrusions are inserted into insertion grooves of the rotation stopping shaped parts 126. Thus, the insert object 120 is not rotated with respect to the slide core. The slide core inserted into the third fluid channel 113 is inserted into the first fluid channel 111 so as to cross each other. After all the slide cores are inserted, when the molten plastic is injected, the injection molding of the pipe connector 100 is completed.

Similarly to the pipe connector 100, in the aforementioned other pipe connector 300, the insert object 320 is initially formed through injection molding, and then the connector body 310 is formed through injection molding while the insert object 320 is embedded. Initially, after the insert object 320 is inserted into the mold, the slide cores are inserted into the first fluid channel 311 and the second fluid channel 312. Accordingly, the slide cores are in contact with curved cut-off ends (not shown) formed in the insert object 320 and are inserted into rotation stopping shaped parts (not shown) due to the insert object 320 of the other pipe connector 320 having the same structure as that of the insert object 120 of the pipe connector 100, and thus, the insert object 320 is not rotated. After all the slide cores are inserted, when the molten plastic is injected, the injection molding of the other pipe connector 300 is completed.

Figure 5:
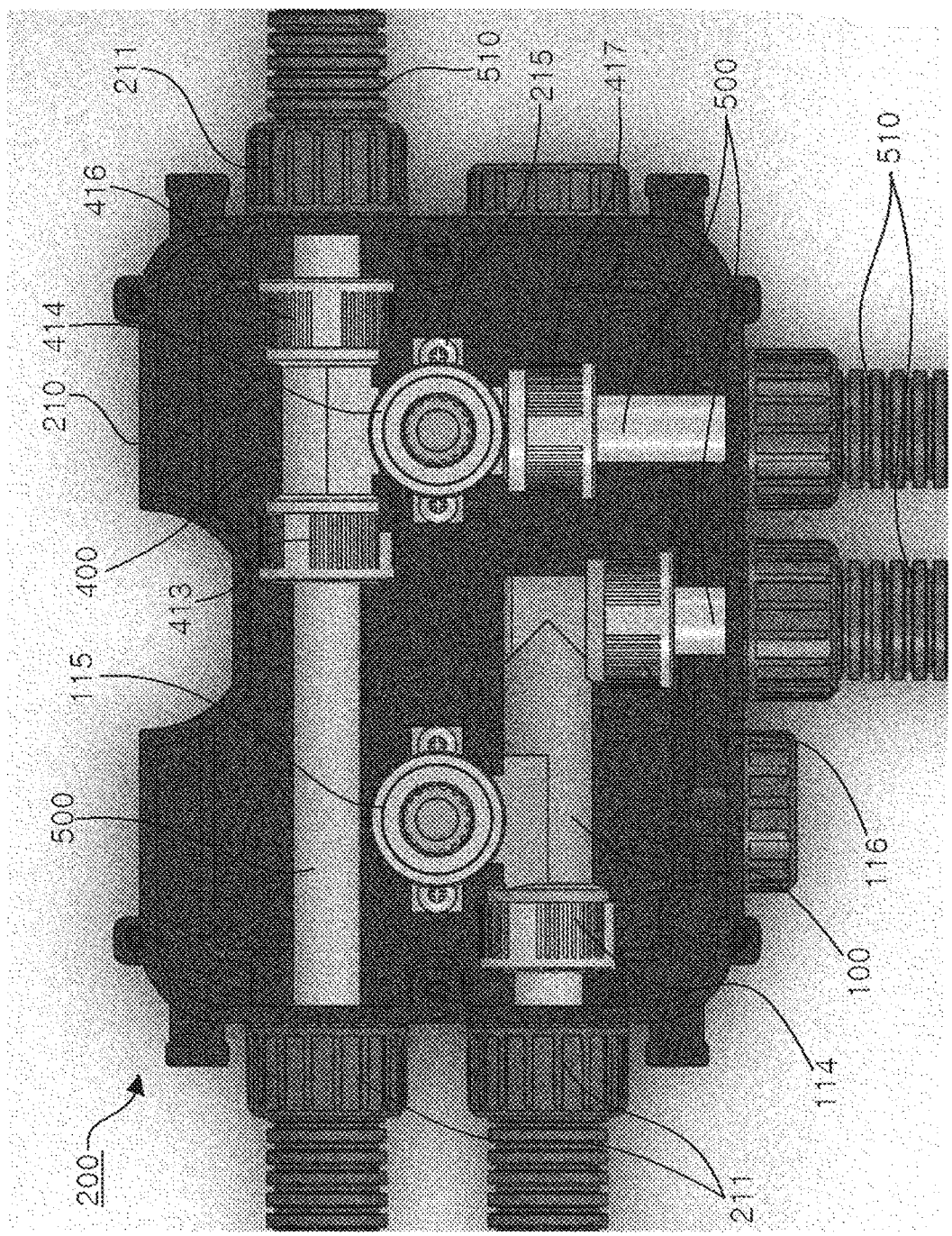
FIG. 5 is a plan view of a pipe-connected embedded box according to the present invention.

FIG. 5 is a plan view showing the pipe-connected embedded box 200 including the first and second pipe connectors 100 and 400 according to the present invention. As shown in this drawing, the pipe-connected embedded box 200 includes an inner box body 210 that is embedded in a wall, and the first and second pipe connectors 100 and 400 that are accommodated in and attached to the inner box body 210.

A plurality of pipe through holes 211 is formed on one surface of the inner box body 210 such that pipes 500 embedded in the wall can pass through the inside of the inner box body 210. In some cases, the number of pipe through holes 211 corresponding to the number of pipes 500 passing through the inner box body 210 may be increased or decreased, and extra pipe through holes 211 may be further formed on one surface of the inner box body 210. Bellows pipes 510 for protecting the pipes 500 are connected to the pipe through holes 211. The bellows pipes 510 are embedded within a wall of a building, and protect the pipes 500 such that the pipes 500 are not exposed or are not in contact with concrete or a block. Simultaneously, when it is necessary to replace the pipe 500, the bellows pipe serves to maintain a space such that the replacing operation such as the extraction and reinsertion of the pipe 500 is easily performed.

The first and second pipe connectors 100 and 400 are coupled within the inner box body 210 using a screw 215 through the respective fixation parts. Such coupling may be performed using a wedge, a pin, a piece, and a hook in addition to the coupling using the screw 215. Since the pipe connector 100 has the same structure as that of the embodiment of the pipe connector 100 shown in FIG. 1, the pipes 500 embedded in the wall are connected to the first connection part 114 and the third connection part 116, and the pipes which are extracted to the front surface of the embedded box 200 and are exposed to the outside are connected to the second connection pipe 115. The second pipe connector 400 has the same structure as that of the embodiment of the pipe connector 300 of FIG. 4, and further includes the third fluid channel crossing the first fluid channel and the second fluid channel and the corresponding connection part. The first connection part 413 and the third connection part 416 of the first fluid channel are connected to the second pipe connector 400, the pipes 500 embedded in the wall are connected to the fourth connection part 417 of the third fluid channel, and the pipes which are extracted to the front surface of the embedded box 200 and are exposed to the outside are connected to the second connection part 414 of the second fluid channel. The pipes which are exposed to the outside of the embedded box from the second connection parts 115 and 414 of the first and second pipe connectors 100 and 400 are connected to pipes connected from a boiler or a gas supply unit, and cold water and hot water are distributed or gas is supplied when necessary. In some cases, in order to extract the pipe 500 in a desired direction, pipe connectors having various structures may be accommodated in and may be attached in the inner box body 210.

What is claimed is:
1. A pipe connector comprising:
a connector body having a tubular shape and including a first fluid channel extending in a first fluid channel axial line of the connector body and a second fluid channel extending in a second fluid channel axial line of the connector body, wherein the first fluid channel axial line and the second fluid channel axial line are displaced from each other so as not to cross each other, and the first fluid channel and the second fluid channel are in fluid communication with each other and do not cross each other; and
an insert object having a tubular shape and received in an inner space of the connector body, the insert object defining a first connection fluid channel and a second connection fluid channel serially connected, in angular relation, to each other, and the insert object including a first opening at a proximal end of the a first connection fluid channel, and a second opening at a distal end of the second connection fluid channel,
wherein the first opening of the insert object is connected to and open through a side wall of the first fluid channel of the connector body in fluid communication thereto,
wherein the second opening of the insert object is open along the second fluid channel axial line and connected to the second fluid channel of the connector body in fluid communication thereto.
2. The pipe connector according to claim 1,
wherein the second opening has a rotation stopping shaped part having a non-circular shape in at least a partial circumferential region with respect to a center of the axis.
3. The pipe connector according to claim 1,
wherein the first opening includes a curved cut-off end matching with an inner wall surface of the first fluid channel.
4. The pipe connector according to claim 1,
wherein the first connection fluid channel has a thickness greater than a thickness of the second connection fluid channel.
5. The pipe connector according to claim 1,
wherein a reinforcing rib is formed at least any one of an external wall and an internal wall of the first connection fluid channel.
6. The pipe connector according to claim 1, wherein the first connection fluid channel and the second connection fluid channel are arranged at an acute angle relative to each other.
7. A pipe-connected embedded box comprising:
the pipe connector according to claim 1.
8. A pipe-connected embedded box comprising:
the pipe connector according to claim 2.

9. A pipe-connected embedded box comprising:
the pipe connector according to claim 3.
10. A pipe-connected embedded box comprising:
the pipe connector according to claim 4.
11. A pipe-connected embedded box comprising:
the pipe connector according to claim 5.
12. A pipe-connected embedded box comprising:
the pipe connector according to claim 6.

* * * * *